United States Patent
White et al.

(10) Patent No.: US 10,544,746 B2
(45) Date of Patent: Jan. 28, 2020

(54) PRE-TURBINE WIDE-RANGE OXYGEN SENSOR LAMBDA CONTROL DURING SCAVENGING

(71) Applicants: Andrew P White, Holly, MI (US); William P Attard, Brighton, MI (US); Tamer Badawy, Dearborn Heights, MI (US); Lurun Zhong, Troy, MI (US)

(72) Inventors: Andrew P White, Holly, MI (US); William P Attard, Brighton, MI (US); Tamer Badawy, Dearborn Heights, MI (US); Lurun Zhong, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 13 days.

(21) Appl. No.: 16/022,943

(22) Filed: Jun. 29, 2018

(65) Prior Publication Data

US 2020/0003141 A1 Jan. 2, 2020

(51) Int. Cl.
*F02D 41/30* (2006.01)
*F02D 41/14* (2006.01)
*F02D 41/00* (2006.01)

(52) U.S. Cl.
CPC ..... *F02D 41/1456* (2013.01); *F02D 41/0007* (2013.01); *F02D 41/0087* (2013.01); *F02D 41/30* (2013.01)

(58) Field of Classification Search
CPC .. F02D 41/1456; F02D 41/0087; F02D 41/30; F02D 41/0007
USPC ...... 123/672, 673; 701/103, 109; 73/114.72, 73/114.73
See application file for complete search history.

(56) References Cited

U.S. PATENT DOCUMENTS

| | | | |
|---|---|---|---|
| 6,827,051 B2 | 12/2004 | Kawasaki et al. |
| 6,904,355 B2 | 6/2005 | Yasui et al. |
| 7,275,516 B1 | 10/2007 | Cunningham et al. |
| 8,001,833 B2 | 8/2011 | Delp |
| 9,103,293 B2 | 8/2015 | Jankovic et al. |
| 9,399,962 B2 | 7/2016 | Hagner et al. |
| 2015/0101564 A1 | 4/2015 | Surnilla et al. |

*Primary Examiner* — Hai H Huynh
(74) *Attorney, Agent, or Firm* — Ralph E Smith

(57) ABSTRACT

A system and method of utilizing a pre-turbine wide-range oxygen (WRO2) sensor during both individual cylinder fuel control (ICFC) and scavenging of a turbocharged engine involve receiving, by a controller and from the WRO2 sensor arranged in an exhaust system of the engine at a point upstream of a turbine of a turbocharger of the engine, an unfiltered WRO2 signal indicative of a fuel/air (FA) ratio of exhaust gas produced by the engine, performing, by the controller, ICFC by controlling the engine using the unfiltered WRO2 signal, performing, by the controller, engine cycle average filtering of the WRO2 signal to obtain a filtered WRO2 signal, and, while the engine is scavenging, performing, by the controller, engine FA ratio and emissions control using the filtered WRO2 signal.

18 Claims, 3 Drawing Sheets

PRE-TURBINE WIDE-RANGE OXYGEN SENSOR LAMBDA CONTROL DURING SCAVENGING

FIELD

The present application generally relates to turbocharged engines and, more particularly, to pre-turbine wide-range oxygen (WRO2) sensor lambda control in a turbocharged engine during scavenging.

BACKGROUND

One or more turbochargers could be implemented on an internal combustion engine, each of which includes a compressor that increases airflow into the engine thereby allowing for more fuel to be injected and more drive torque to be generated. Exhaust gas resulting from combustion is expelled from the cylinders into an exhaust system and its kinetic energy drives a turbine of each turbocharger, which in turn drives the respective compressor. One or more wide-range oxygen (WRO2) sensors are typically implemented in the exhaust system to measure a fuel/air (FA) ratio of the exhaust gas. The FA ratio of the exhaust gas is used for a variety of engine controls. Some of these engine controls, however, have competing requirements for the placement of the WRO2 sensors. Therefore, while conventional turbocharged engine control systems work well for their intended purpose, there remains a need for improvement in the relevant art.

SUMMARY

According to one example aspect of the invention, a control system for a turbocharged engine configured for scavenging is presented. In one exemplary implementation, the control system comprises: a wide-range oxygen (WRO2) sensor arranged in an exhaust system of the engine at a point upstream of a turbine of a turbocharger of the engine and configured to generate an unfiltered WRO2 signal indicative of a fuel/air (FA) ratio of exhaust gas produced by the engine and a controller configured to: perform individual cylinder fuel control (ICFC) by controlling the engine using the unfiltered WRO2 signal, engine cycle average filter the WRO2 signal to obtain a filtered WRO2 signal, and while the engine is scavenging, perform engine FA ratio and emissions control using the filtered WRO2 signal.

In some implementations, the unfiltered WRO2 signal comprises variations caused by insufficient mixing of the exhaust gas from various cylinders of the engine, and wherein the engine cycle average filtering removes or reduces the variations in the unfiltered WRO2 signal to obtain the filtered WRO2 signal. In some implementations, the controller is configured to perform ICFC by associating the variations in the unfiltered WRO2 signal with respective cylinders of the engine and controlling a fuel system of the engine to inject fuel to the cylinders based on their respective variations in the unfiltered WRO2 signal. In some implementations, the controller is further configured to perform engine FA ratio and emissions control based on the unfiltered WRO2 signal while the engine is not scavenging.

In some implementations, the controller is configured to perform the engine cycle average filtering of the unfiltered WRO2 signal by sampling the unfiltered WRO2 signal at least one of (i) at a predetermined rate and (ii) at a predetermined engine position. In some implementations, the predetermined rate is approximately every 10 milliseconds.

In some implementations, the predetermined engine positions comprise at least one of (i) top dead center of a piston stroke and (ii) a middle of an engine power pulse (EPP). In some implementations, the controller is configured to perform the engine cycle average filtering of the unfiltered WRO2 signal by sampling the unfiltered WRO2 signal (i) every 10 milliseconds, (ii) every piston stroke at top dead center, and (iii) in a middle of every engine power pulse (EPP).

In some implementations, the exhaust system does not comprise a post-turbine WRO2 sensor.

According to another example aspect of the invention, a method of utilizing a pre-turbine WRO2 sensor during both ICFC and scavenging of a turbocharged engine is presented. In one exemplary implementation, the method comprises: receiving, by a controller and from the WRO2 sensor arranged in an exhaust system of the engine at a point upstream of a turbine of a turbocharger of the engine, an unfiltered WRO2 signal indicative of a fuel/air (FA) ratio of exhaust gas produced by the engine, performing, by the controller, ICFC by controlling the engine using the unfiltered WRO2 signal, performing, by the controller, engine cycle average filtering of the WRO2 signal to obtain a filtered WRO2 signal, and while the engine is scavenging, performing, by the controller, engine FA ratio and emissions control using the filtered WRO2 signal.

In some implementations, the unfiltered WRO2 signal comprises variations caused by insufficient mixing of the exhaust gas from various cylinders of the engine, and wherein the engine cycle average filtering removes or reduces the variations in the unfiltered WRO2 signal to obtain the filtered WRO2 signal. In some implementations, performing ICFC comprises associating, by the controller, the variations in the unfiltered WRO2 signal with respective cylinders of the engine and controlling, by the controller, a fuel system of the engine to inject fuel to the cylinders based on their respective variations in the unfiltered WRO2 signal. In some implementations, the method further comprises performing, by the controller, engine FA ratio and emissions control based on the unfiltered WRO2 signal while the engine is not scavenging.

In some implementations, performing engine cycle average filtering of the unfiltered WRO2 signal comprises sampling, by the controller, the unfiltered WRO2 signal at least one of (i) at a predetermined rate and (ii) at a predetermined engine position. In some implementations, the predetermined rate is approximately every 10 milliseconds. In some implementations, the predetermined engine position comprises at least one of (i) top dead center of a piston stroke and (ii) a middle of an EPP. In some implementations, performing engine cycle average filtering of the unfiltered WRO2 signal comprises sampling, by the controller, the unfiltered WRO2 signal (i) every 10 milliseconds, (ii) every piston stroke at top dead center, and (iii) in a middle of every engine power pulse (EPP).

In some implementations, the exhaust system does not comprise a post-turbine WRO2 sensor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, one or more wide-range oxygen (WRO2) sensors are typically implemented in the exhaust system to measure a fuel/air (FA) ratio (also commonly referred to as "lambda") of the exhaust gas. The FA ratio of the exhaust gas is used for a variety of engine controls. Some of these engine controls, however, have competing requirements for the placement of the WRO2 sensors. Individual cylinder fuel control (ICFC), for example, requires a pre-turbine WRO2 sensor implementation in order for the sensor to be able to detect variations in the FA ratio of the exhaust gas produced by individual cylinders. For general engine FA ratio and emissions control, however, the signal from a pre-turbine WRO2 sensor has excessive variations because the exhaust gas is not well mixed. This is particularly true during scavenging operation where cylinder blow-through occurs. Engine FA ratio and emissions control during scavenging thus requires a post-turbine WRO2 sensor implementation.

One possible solution would be to implement two WRO2 sensors: one pre-turbine and one post-turbine. The pre-turbine WRO2 sensor could be utilized for ICFC, and the post-turbine WRO2 sensor could be utilized for engine FA and emissions control during scavenging. These sensors, however, are quite costly and thus requiring an additional sensor would increase vehicle costs. Accordingly, systems and methods are presented that utilize a single pre-turbine WRO2 sensor for both ICFC and engine FA ratio and emissions control during scavenging. When the engine is scavenging, the WRO2 signal is engine cycle average filtered to mitigate (e.g., smooth) or remove the excessive variations in the unfiltered WRO2 signal. This filtered WRO2 signal is then utilized for engine FA ratio and emissions control while scavenging. The unfiltered WRO2 signal is utilized for ICFC.

Figure 1:
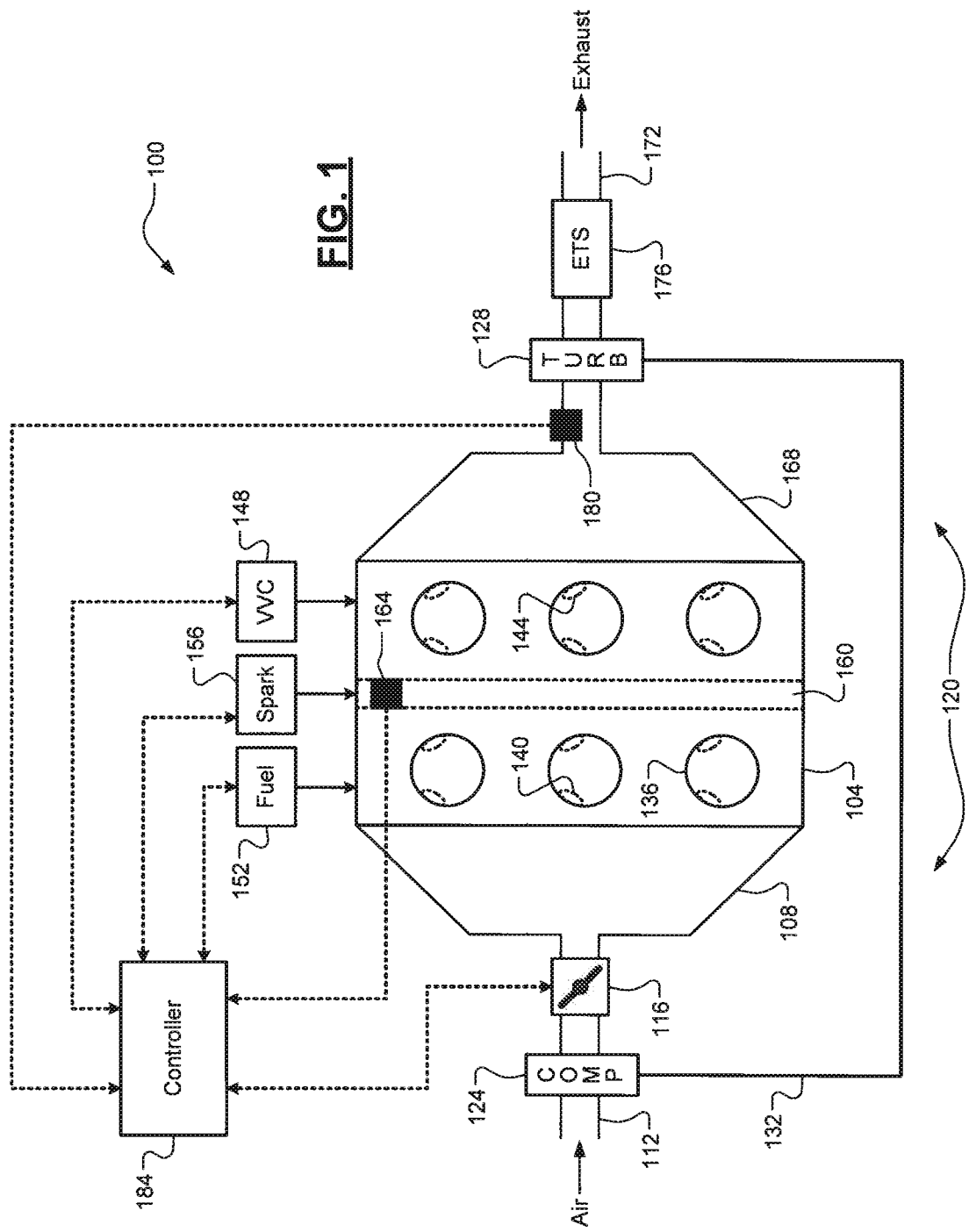
FIG. 1 is a diagram of an example vehicle having a turbocharged engine configured for scavenging and a single pre-turbine wide-range oxygen (WRO2) sensor according to the principles of the present disclosure.

Referring now to FIG. 1, a diagram of a portion of an example vehicle 100 is illustrated. The vehicle 100 includes an engine 104 that draws air into an intake manifold 108 through an intake passage 112 that is regulated by a throttle valve 116. The engine 104 includes at least one turbocharger 120, each of which comprises a compressor (COMP) 124 disposed in the intake passage 112 upstream from the throttle valve 116. Each compressor 124 is configured to force air into the intake manifold 108 for increased engine torque output. The compressor 124 is driven by a turbine (TURB) 128 via a shaft 132, which are discussed in greater detail below. While a single turbocharger 120 is illustrated, it will be appreciated that the engine 104 could include multiple turbochargers. It will also be appreciated that the engine 104 could include other components disposed in the intake passage 112, such as an air filter, an air cooler, a bypass or surge valve for the compressor 124, and a differential pressure (dP) valve (e.g., for a multi-turbocharger and multi-intake passage configuration).

The air in the intake manifold 108 is distributed to a plurality of cylinders 136 via respective intake valves 140. Timing and/or lift of the intake valves 140 and corresponding exhaust valves 144 are controlled by a variable valve control (VVC) system 148. When the engine 104 is scavenging, there is an overlap during which both the intake valves 140 and corresponding exhaust valves 144 are open and cylinder blow-through occurs. This is typically performed at low engine speeds (e.g., 2500 revolutions per minute (RPM) or less). The air distributed to the cylinders 136 is combined with fuel (e.g., gasoline) from a fuel system 152 (direct fuel injection, port fuel injection, etc.) to form an air/fuel mixture. The air/fuel mixture is compressed by pistons (not shown) within the cylinders 136 and ignited by spark from spark plugs 156 to drive the pistons and generate drive torque at a crankshaft 160. A crankshaft position sensor 164 measures a rotational position of the crankshaft 160. Exhaust gas resulting from combustion is expelled from the cylinders 136 via the exhaust valves 144 and into an exhaust manifold 168.

The kinetic energy of the exhaust gas powers the turbine 128 of the turbocharger 120, which in turn drives the compressor 124 via the shaft 132 as previously described. The exhaust gas flows through an exhaust passage 172 and is treated by an exhaust treatment system (ETS) 176 (e.g., a three-way catalytic converter) to decrease or eliminate emissions before release into the atmosphere. It will be appreciated that there could be other components disposed in the exhaust passage 172, such as a blow-off or wastegate valve for the turbine 128. A WRO2 sensor 180 is disposed upstream from the turbine 128 and is also referred to herein as pre-turbine WRO2 sensor 180. It will be appreciated that for a multi-turbocharger configuration with separate exhaust manifolds/systems, there could be two pre-turbine WRO2 sensors (i.e., one for each exhaust manifold/system). It will also be appreciated that while a WRO2 sensor is specifically discussed and claimed herein, another suitable type of pre-turbine exhaust gas O2 sensor could be implemented and utilized for both scavenging engine FA/emissions control and ICFC as described herein. A controller 184 controls operation of the engine 104, based on the signals from the crankshaft position sensor 164 and the pre-turbine WRO2 sensor 180, which is now described in greater detail.

Figure 2:
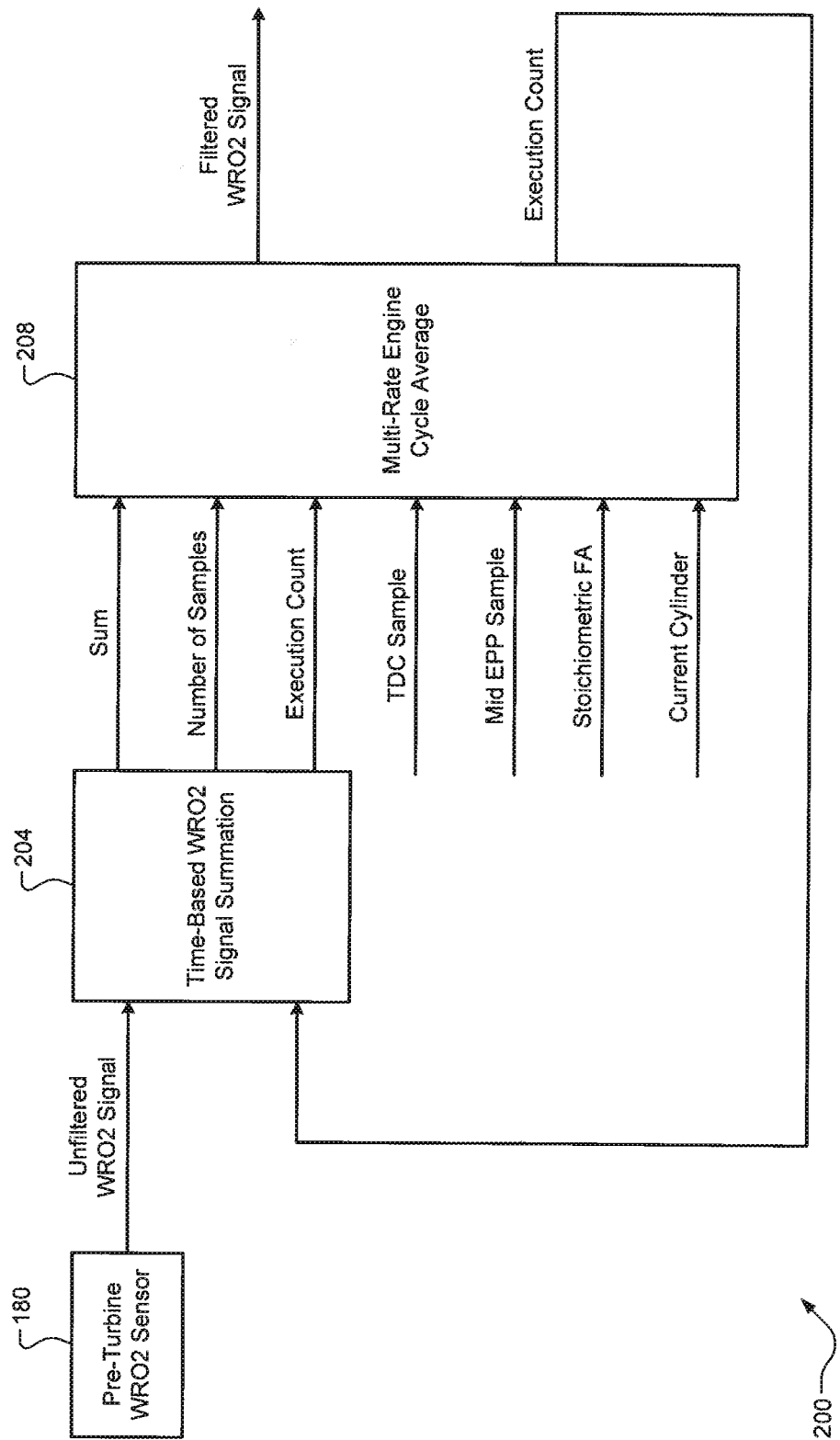
FIG. 2 is a functional block diagram of an example controller architecture for engine cycle average filtering by sampling an unfiltered WRO2 signal at a predetermined rate and at predetermined engine positions according to the principles of the present disclosure.

Referring now to FIG. 2, an example architecture 200 for the controller 184 to perform time-based sampling and engine cycle averaging of the unfiltered WRO2 signal to obtain a filtered WRO2 signal is illustrated. It will be appreciated that this architecture is merely one exemplary configuration and other configurations and/or combinations of time based and/or engine position/event based sampling and averaging could be utilized. A time-based WRO2 signal summation 204 receives the raw or unfiltered WRO2 signal from the pre-turbine WRO2 sensor 180. The WRO2 signal summation 204 samples the unfiltered WRO2 signal at a predetermined rate and outputs the sum of these samples, the number of samples, and an execution count value. In one exemplary implementation, the predetermined rate is every 10 milliseconds. It will be appreciated, however, that other sampling rates could be utilized.

A multi-rate engine cycle average 208 receives the outputs of the WRO2 signal summation 204. The multi-rate engine cycle average 208 also samples the unfiltered WRO2 signal at predetermined engine events, including current cylinder piston top-dead-center (TDC) position and a mid-engine power pulse (mid-EPP) position ((known via the crankshaft position from sensor 164). The multi-rate engine cycle average 208 averages the time-based and position-based samples of the unfiltered WRO2 signal at each mid-EPP position to obtain and output a filtered WRO2 signal. This filtered WRO2 signal is smooth compared to the unfiltered WRO2 signal and thus is able to be utilized for engine FA ratio and emissions control during scavenging. The multi-rate engine cycle average 208 also outputs an execution count value, which resets the WRO2 signal summation 204.

Figure 3:
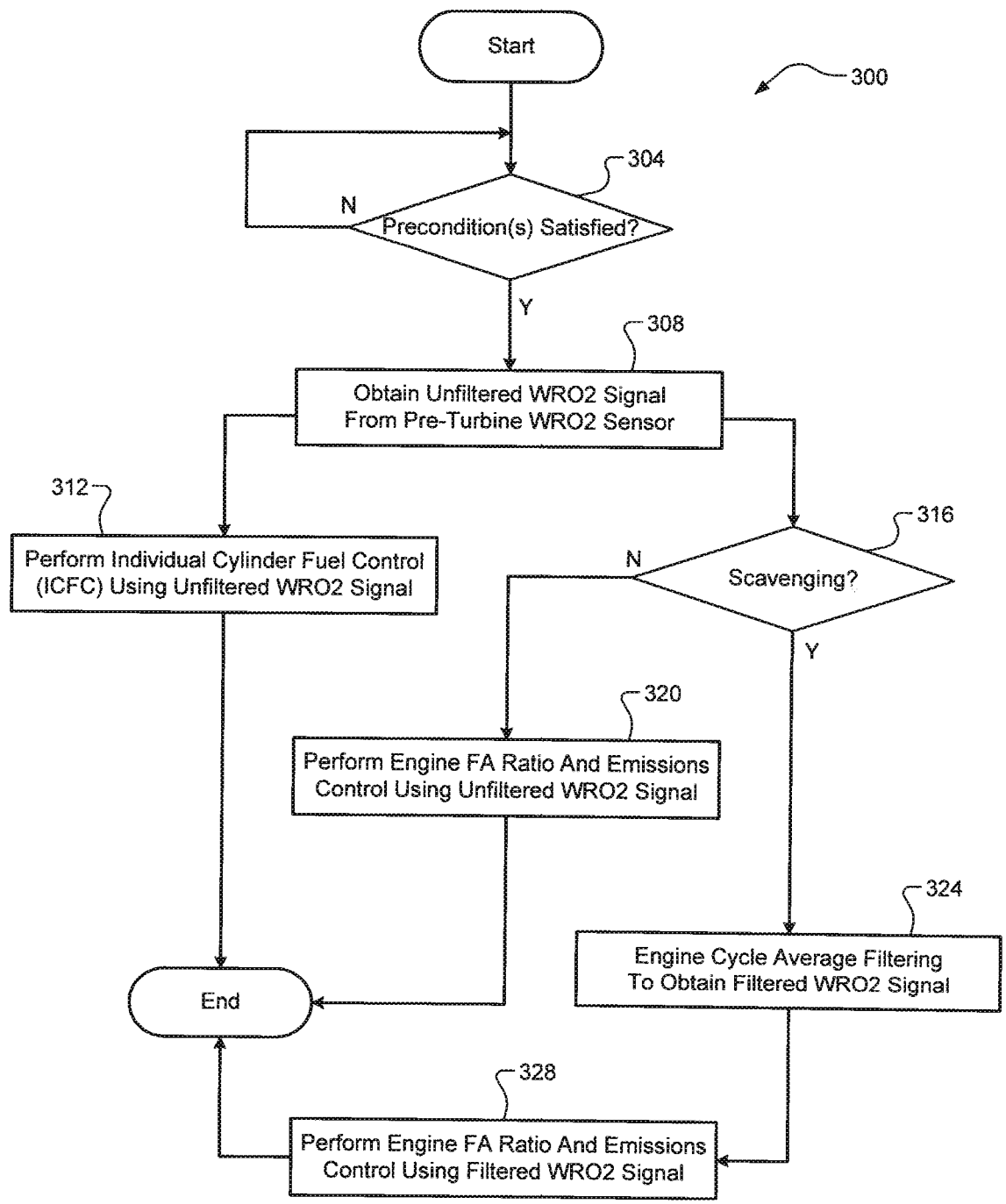
FIG. 3 is a flow diagram of an example method of utilizing the single pre-turbine WRO2 sensor during both individual cylinder fuel control (ICFC) and scavenging of the turbocharged engine according to the principles of the present disclosure.

Referring now to FIG. 3, a flow diagram of an example method 300 utilizing a single pre-turbine WRO2 sensor 184 during both ICFC and scavenging of the turbocharged engine 104. At 304, the controller 184 determines whether a set of one or more preconditions are satisfied. These preconditions could include, for example, the engine 104 running properly without any malfunctions detected. At 308, the controller 184 obtains the unfiltered WRO2 signal from the pre-turbine WRO2 sensor 180. The method 300 then splits into two different paths that operate concurrently. At 312, the controller 184 performs ICFC using the unfiltered WRO2 signal. This includes, for example, identifying the FA ratio of exhaust gas produced by each cylinder 136 and adjusting fueling (via fuel system 152) to each cylinder 136 accordingly (e.g., to maintain a stoichiometric FA ratio). This portion of the method 300 then ends or returns to 304. At 316, the controller 184 determines whether the engine 104 is scavenging.

When false, the method 300 proceeds to 320 where the controller performs engine FA ratio and emissions control using the unfiltered WRO2 signal. This includes, for example, adjusting airflow into the engine 104 (via throttle valve 116 and/or intake valve 140 control via the VVC system 148) and/or fuel control via the fuel system 152 (e.g., to maintain a stoichiometric FA ratio and to mitigate or eliminate emissions). This portion of the method 300 then ends or returns to 304. When 316 is true (i.e., the engine 104 is scavenging), the method 300 proceeds to 324 where the controller 184 performs engine cycle average filtering to obtain the filtered WRO2 signal. At 328, the controller 184 performs engine FA ratio and emissions control using the filtered WRO2 signal. This portion of the method 300 then ends or returns to 304.

It will be appreciated that the term "controller" as used herein refers to any suitable control device, control system, or set of multiple control devices that is/are configured to perform at least a portion of the techniques of the present disclosure. Non-limiting examples include an application-specific integrated circuit (ASIC), one or more processors and a non-transitory memory (e.g., non-volatile memory, or NVM) having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a turbocharged engine configured for scavenging, the control system comprising:
a wide-range oxygen (WRO2) sensor arranged in an exhaust system of the engine at a point upstream of a turbine of a turbocharger of the engine and configured to generate an unfiltered WRO2 signal indicative of a fuel/air (FA) ratio of exhaust gas produced by the engine; and
a controller configured to:
perform individual cylinder fuel control (ICFC) by controlling the engine using the unfiltered WRO2 signal;
engine cycle average filter the WRO2 signal to obtain a filtered WRO2 signal; and
while the engine is scavenging, perform engine FA ratio and emissions control using the filtered WRO2 signal.

2. The control system of claim 1, wherein the unfiltered WRO2 signal comprises variations caused by insufficient mixing of the exhaust gas from various cylinders of the engine, and wherein the engine cycle average filtering removes or reduces the variations in the unfiltered WRO2 signal to obtain the filtered WRO2 signal.

3. The control system of claim 2, wherein the controller is configured to perform ICFC by associating the variations in the unfiltered WRO2 signal with respective cylinders of the engine and controlling a fuel system of the engine to inject fuel to the cylinders based on their respective variations in the unfiltered WRO2 signal.

4. The control system of claim 1, wherein the controller is further configured to perform engine FA ratio and emissions control based on the unfiltered WRO2 signal while the engine is not scavenging.

5. The control system of claim 1, wherein the controller is configured to perform the engine cycle average filtering of the unfiltered WRO2 signal by sampling the unfiltered WRO2 signal at least one of (i) at a predetermined rate and (ii) at a predetermined engine position.

6. The control system of claim 5, wherein the predetermined rate is approximately every 10 milliseconds.

7. The control system of claim 5, wherein the predetermined engine positions comprise at least one of (i) top dead center of a piston stroke and (ii) a middle of an engine power pulse (EPP).

8. The control system of claim 5, wherein the controller is configured to perform the engine cycle average filtering of the unfiltered WRO2 signal by sampling the unfiltered WRO2 signal (i) every 10 milliseconds, (ii) every piston stroke at top dead center, and (iii) in a middle of every engine power pulse (EPP).

9. The control system of claim 1, wherein the exhaust system does not comprise a post-turbine WRO2 sensor.

10. A method of utilizing a pre-turbine wide-range oxygen (WRO2) sensor during both individual cylinder fuel control (ICFC) and scavenging of a turbocharged engine, the method comprising:
receiving, by a controller and from the WRO2 sensor arranged in an exhaust system of the engine at a point upstream of a turbine of a turbocharger of the engine, an unfiltered WRO2 signal indicative of a fuel/air (FA) ratio of exhaust gas produced by the engine;
performing, by the controller, ICFC by controlling the engine using the unfiltered WRO2 signal;

performing, by the controller, engine cycle average filtering of the WRO2 signal to obtain a filtered WRO2 signal; and while the engine is scavenging, performing, by the controller, engine FA ratio and emissions control using the filtered WRO2 signal.

11. The method of claim 10, wherein the unfiltered WRO2 signal comprises variations caused by insufficient mixing of the exhaust gas from various cylinders of the engine, and wherein the engine cycle average filtering removes or reduces the variations in the unfiltered WRO2 signal to obtain the filtered WRO2 signal.

12. The method of claim 11, wherein performing ICFC comprises associating, by the controller, the variations in the unfiltered WRO2 signal with respective cylinders of the engine and controlling, by the controller, a fuel system of the engine to inject fuel to the cylinders based on their respective variations in the unfiltered WRO2 signal.

13. The method of claim 10, further comprising performing, by the controller, engine FA ratio and emissions control based on the unfiltered WRO2 signal while the engine is not scavenging.

14. The method of claim 10, wherein performing engine cycle average filtering of the unfiltered WRO2 signal comprises sampling, by the controller, the unfiltered WRO2 signal at least one of (i) at a predetermined rate and (ii) at a predetermined engine position.

15. The method of claim 14, wherein the predetermined rate is approximately every 10 milliseconds.

16. The method of claim 14, wherein the predetermined engine position comprises at least one of (i) top dead center of a piston stroke and (ii) a middle of an engine power pulse (EPP).

17. The method of claim 14, wherein performing engine cycle average filtering of the unfiltered WRO2 signal comprises sampling, by the controller, the unfiltered WRO2 signal (i) every 10 milliseconds, (ii) every piston stroke at top dead center, and (iii) in a middle of every engine power pulse (EPP).

18. The method of claim 10, wherein the exhaust system does not comprise a post-turbine WRO2 sensor.

* * * * *